US011250571B2

United States Patent
Lindskog et al.

(10) Patent No.: US 11,250,571 B2
(45) Date of Patent: Feb. 15, 2022

(54) ROBUST USE OF SEMANTIC SEGMENTATION IN SHALLOW DEPTH OF FIELD RENDERING

(71) Applicant: Apple Inc., Cupertino, CA (US)

(72) Inventors: Alexander Lindskog, San Jose, CA (US); Michael W. Tao, San Jose, CA (US); Alexandre Naaman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 329 days.

(21) Appl. No.: 16/566,155

(22) Filed: Sep. 10, 2019

(65) Prior Publication Data

US 2020/0082535 A1 Mar. 12, 2020

Related U.S. Application Data

(60) Provisional application No. 62/729,849, filed on Sep. 11, 2018.

(51) Int. Cl.
| | |
|---|---|
| *G06T 7/11* | (2017.01) |
| *G06T 5/00* | (2006.01) |
| *G06K 9/72* | (2006.01) |
| *G06K 9/00* | (2022.01) |

(52) U.S. Cl.
CPC ............ *G06T 7/11* (2017.01); *G06K 9/00221* (2013.01); *G06K 9/00362* (2013.01); *G06K 9/726* (2013.01); *G06T 5/002* (2013.01); *G06T 2207/20084* (2013.01); *G06T 2207/30201* (2013.01)

(58) Field of Classification Search
CPC . G06T 7/11; G06T 5/002; G06T 2207/30201; G06T 2207/20084; G06K 9/726; G06K 9/00362; G06K 9/00221; G06K 9/00228; G06K 9/34
See application file for complete search history.

(56) References Cited

U.S. PATENT DOCUMENTS

| | | | |
|---|---|---|---|
| 9,519,956 B2 | 12/2016 | Chen | |
| 9,674,506 B2 | 6/2017 | Tian | |
| 9,712,720 B2 | 7/2017 | Nestares | |
| 10,776,671 B2 * | 9/2020 | Lin | ........................ G06K 9/036 |

(Continued)

*Primary Examiner* — Phuoc Tran
(74) *Attorney, Agent, or Firm* — Blank Rome LLP (57) ABSTRACT

This disclosure relates to techniques for the robust usage of semantic segmentation information in image processing techniques, e.g., shallow depth of field (SDOF) renderings. Semantic segmentation may be defined as a process of creating a mask over an image, wherein pixels are segmented into a predefined set of semantic classes. Segmentations may be binary (e.g., a 'person pixel' or a 'non-person pixel') or multi-class (e.g., a pixel may be labelled as: 'person,' 'dog,' 'cat,' etc.). As semantic segmentation techniques grow in accuracy and adoption, it is becoming increasingly important to develop methods of utilizing such segmentations and developing flexible techniques for integrating segmentation information into existing computer vision applications, such as synthetic SDOF renderings, to yield improved results in a wide range of image capture scenarios. In some embodiments, a refinement operation may be employed on a camera device's initial depth, disparity and/or blur estimates that leverages semantic segmentation information.

27 Claims, 6 Drawing Sheets

(56) References Cited

U.S. PATENT DOCUMENTS

2013/0315478 A1\* 11/2013 Schiller ............... G06K 9/4647
                                                    382/159
2017/0372479 A1   12/2017 Somanath
2021/0142455 A1\*  5/2021 Hsiao ...................... G06N 3/02

\* cited by examiner

ROBUST USE OF SEMANTIC SEGMENTATION IN SHALLOW DEPTH OF FIELD RENDERING

TECHNICAL FIELD

This disclosure relates generally to the field of digital imaging. More particularly, but not by way of limitation, it relates to techniques for the robust usage of semantic segmentation information in image processing techniques, e.g., shallow depth of field (SDOF) renderings.

BACKGROUND

In camera imaging, multiple factors, such as the size of the lens aperture, may influence the "depth of field" (DOF) of an image. Large digital single-lens reflex (DSLR) cameras and cameras having wide aperture lenses can be used to capture images with a relatively shallow depth of field, meaning that the range of scene depths for which objects in the captured image will appear sharp (i.e., in focus) is very small compared to images captured under other conditions (e.g., a narrower aperture). While the limited range of in focus regions of a SDOF image may seem to be a physical limitation, it has been turned into an aesthetic advantage applied by photographers for over a century. For example, so-called SDOF photography may be particularly fit for portrait photography, since it can emphasize the subject (who is typically brought into the camera's focus range), while deemphasizing the background, which may otherwise be of less interest in the scene (e.g., by making the background appear blurry and/or out of focus).

The advent of mobile, multifunction devices, such as smartphones and tablet devices, has resulted in a desire for small form factor cameras capable of generating high levels of image quality in real time or near-real time for integration into such mobile, multifunction devices. Increasingly, as users rely on these multifunction devices as their primary cameras for day-to-day use, users demand features that they have become accustomed to using in dedicated-purpose camera devices, e.g., "portrait-style" SDOF photography modes.

In some instances, such as the aforementioned small form factor cameras used in mobile devices, it may be difficult to optically achieve a given level of SDOF. For example, a mobile device's camera may have a smaller aperture than the smallest aperture used by a DSLR camera, and thus may have a relatively large depth of field compared to what may be achieved by a DSLR camera. In these instances, to achieve an image having a shallower depth of field, it may be necessary to artificially synthesize an out-of-focus blur in the image after it is captured, e.g., by using estimated depth maps for the captured images.

For example, in such portrait-style, synthetic SDOF images, a greater amount of blurring may be applied to objects and pixels that are estimated to be farther away from the focal plane of a captured scene. In other words, in synthetic SDOF images having a focal plane in the foreground of the captured scene, objects that are "deeper" in the captured scene may have a greater amount of blurring applied to them, whereas in focus foreground objects, such as a human subject, may remain relatively sharper, thus pleasantly emphasizing the appearance of the human subject to a viewer of the image.

In some cases, a "blur map" corresponding to a captured image may be utilized in the synthetic SDOF image generation process. Blur maps may be used to store values for one or more pixels in the captured image, which values are representative of an amount of blurring that is to be applied to corresponding pixels in the captured image to render the desired SDOF effects. For example, in some instances, blur maps may store a value representative of a blurring radius to be applied to the corresponding pixel in the captured image, though use of blurring radii in a blur map is just one example of a particular value that may be stored in a blur map. One issue with the use of blur maps in SDOF rendering, however, is that they typically do not have a high spatial resolution, e.g., as compared to the captured color images to which they will be applied, thus resulting in the edges of in focus (e.g., foreground) objects lacking some refinement in the resultant synthetic SDOF image. Another issue with blur maps is the presence of depth estimation errors, e.g., where background pixels may erroneously be classified as foreground pixels (thus introducing sharp artifacts in the background of the scene) and/or where foreground pixels may erroneously be classified as background pixels (thus introducing unintentional or unnatural blurriness in the subject of interest in the scene).

One potential solution to the issues caused by the poor spatial resolution of blur maps is to utilize semantic segmentation, e.g., to create a pixel-wise division of the captured scene into classes, e.g., as between 'person pixels' and 'non-person pixels,' to help drive the determination of where in the image the blurring effects should be applied to render the desired SDOF effects. Semantic segmentation, according to some embodiments, may involve a process of creating a mask, e.g., a per-pixel mask, over a captured image, wherein pixels are assigned (or "segmented") into a predefined set of semantic classes. As mentioned above, such segmentations may be binary (e.g., a given pixel may be classified as either a 'person pixel' or a 'non-person pixel'), or segmentations may also be multi-class segmentations (e.g., a given pixel may be labelled as: 'person,' 'dog,' 'cat,' or 'other').

Thus, some approaches to generating synthetic SDOF images may use a high-detail segmentation mask to segment out people (or other objects of interest the segmentation is trained to identify) and then overlay the segmented people (or other objects of interest the segmentation is trained to identify) as being fully sharp, i.e., on top of a blurred background. In some instances, this overlay effect may be achieved via the usage of an alpha matte that defines the amount of blending (e.g., via the control of transparency) between the base or background layer and the segmented overlay layer. However, using overlay layer pixels having intermediate values of alpha (e.g., 0.5 on a scale of 0 to 1), may create the effect of a sharp pixel pasted on top of blurred pixel, causing a ghosting or shimmering effect that may be undesirable. This approach, too, can cause there to be a lack of gradual blurring, e.g., as between the people in the foreground of the scene and the objects in the background of the scene, which can also look unnatural in the resultant synthetic SDOF image.

As semantic segmentation techniques grow in accuracy and adoption, it is becoming increasingly important to develop methods of utilizing such semantic segmentations and developing flexible techniques for integrating segmentation information into existing computer vision applications, such as depth, disparity, and/or blur map creation in a robust fashion, in order to yield improved results in a wide range of image capture scenarios and, in particular, in the rendering of synthetic SDOF effects to captured images.

SUMMARY

Camera devices, program storage devices, and related methods are disclosed herein that are configured to robustly leverage semantic segmentation information in image processing techniques, e.g., the synthesis out-of-focus background rendering effects in images captured by large depth of field ("LDOF") cameras, e.g., small form-factor cameras having smaller lens apertures. This synthetic rendering of these effects may be used to approximate the look of an image captured with a true SDOF camera. It should be appreciated that any description of creating/synthesizing/rendering a SDOF or out-of-focus effect from an LDOF image (or image captured from a LDOF camera) is meant to capture a relative change in the depth of field of the image (i.e., the image has a first "large" depth of field when captured that is synthetically reduced to a smaller "shallow" depth of field) and not to imply any particular ranges of depth of field.

According to some embodiments disclosed herein, the camera devices may utilize one (or more) cameras and image sensors to capture an input image of a scene, as well as corresponding depth/disparity information for the captured scene, which may provide an initial estimate of the depth of the various objects in the captured scene and, by extension, an indication of the portions of the captured image that are believed to be in the scene's background and/or foreground. For example, in some embodiments, the initial depth/disparity information for the captured scene may be obtained by using a secondary stereo camera, focus pixels, and/or other types of depth/disparity sensors. According to some such embodiments, the depth information data may be converted into the form of an initial blur map, e.g., a two-dimensional array of values, wherein each value represents a radius, diameter (or other size-indicative parameter) of the blurring operation to be applied to the corresponding pixel in the captured image in a blurring operation.

After obtaining the initial blur map, semantic segmentation information may be used to refine the initial blur map in a robust fashion. For example, in some embodiments, a high detail segmentation mask may be obtained that provides an indication of the portions of the captured image that contain "people" (or other type of segmented object in the scene that is desired to be in focus in a given implementation). Based on the obtained segmentation mask, a determined amount of blurring may be subtracted from the amount of blurring indicated in the initial blur map for portions of the captured image that have been segmented out as being "people" (or other type of segmented object in the scene that is desired to be in focus in a given implementation).

Some advantages of this segmentation-based, targeted subtractive approach to modifying the initial blur map are that it will reduce the blurring amount applied to any segmented objects (including making finer details more visible) in a gradual way, thus taking advantage of the increased detail transfer from the high resolution segmentation mask, as well as improving any defects or errors that may exist in the initial blur map, e.g., from errors/inaccuracies in the initial depth/disparity estimates. Further, while some non-segmented objects in the captured image may be made sharper via the aforementioned blur subtraction process, they will not be made entirely sharp. Visually, this is still more pleasing than the overlay scenario described above, wherein all pixels within the segmentation mask are rendered as being fully sharp.

Further, in some embodiments, in addition to subtracting from the amount of blurring indicated in the initial blur map for portions of the captured image that have been segmented out as being people (or other segmented object class), the amount of blurring to be applied to areas that are not considered as being people (or other segmented object class) could be increased by a moderate amount. This could help alleviate (or make less noticeable) some of the errors/inaccuracies in the initial depth/disparity estimates.

Thus, according to some embodiments, a non-transitory program storage device is disclosed. The program storage device is readable by one or more processors. Instructions are stored on the program storage device for causing the one or more processors to: obtain a first image of a scene from one or more image capture devices, the first image comprising a first plurality of pixels, the pixels having color values; obtain an initial blur map for the first image; obtain at least one segmentation mask comprising a first plurality of segmentation values, wherein each segmentation value corresponds to a pixel in the first image; perform a refinement operation on the initial blur map, wherein the refinement operation is based, at least in part, on the at least one segmentation mask and the initial blur map; generate a refined blur map for the first image based on the refinement operation; and generate a blurred version of the first image based, at least in part, on the refined blur map.

According to other embodiments, the instructions may further cause the one or more processors to obtain a confidence mask for one of the at least one obtained segmentation masks, wherein the refinement operation is further based, at least in part, on the obtained confidence mask. In some embodiments, one or more of the segmentation masks (and corresponding confidence masks) may be obtained as an output of a neural network, e.g., a Convolutional Neural Network (CNN).

According to still other embodiments, at least two segmentation masks may be obtained, wherein the refinement operation is further based, at least in part, on each of the at least two segmentation masks. Each segmentation mask may be trained to segment out different classes of objects in the captured scene, and each may have a tunable amount of influence on the blur map refinement operation.

According to yet other embodiments, the instructions may further cause the one or more processors to perform an object-specific blur treatment on the refined blur map, wherein the object-specific blur treatment may comprise, e.g., a face-specific blur treatment and/or a body-specific blur treatment. In some embodiments, the objet-specific blur treatment may be performed before the final blurred version of the first image is generated from the refined blur map.

Various methods of refining blur maps, e.g., to be used for SDOF renderings, are also disclosed herein, in accordance with the program storage device embodiments enumerated above.

Various electronic devices are also disclosed herein, in accordance with the program storage device embodiments enumerated above. Such electronic devices may comprise a memory, one or more image capture devices, a display, a user interface, and one or more processors operatively coupled to the memory. Instructions may be stored in the memory, the instructions causing the one or more processors to perform techniques in accordance with the program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
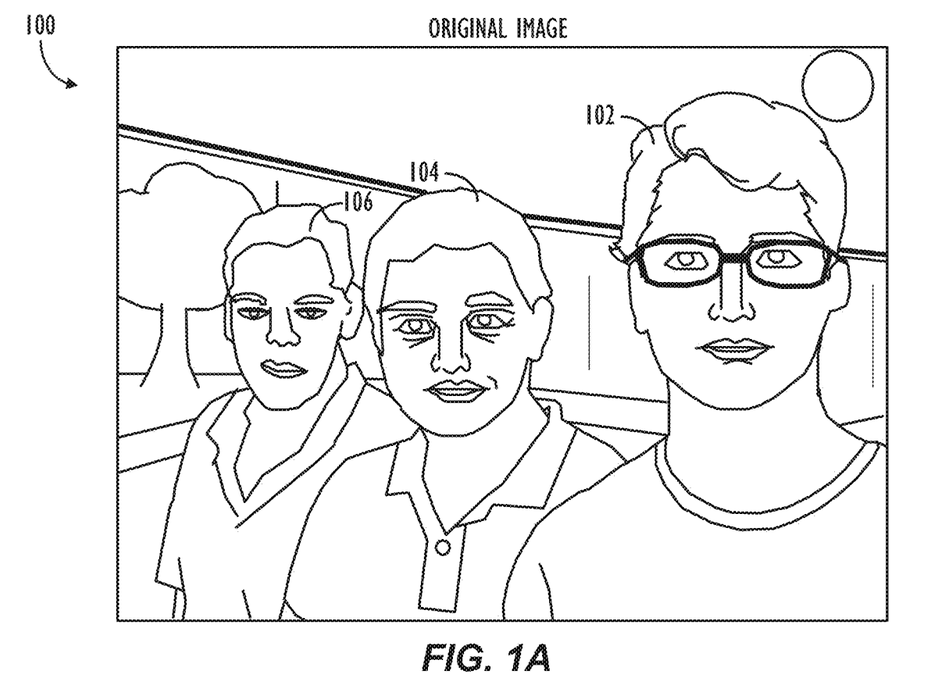
FIG. 1A is an image of a scene to which synthetic SDOF effects are desired to be applied.

Turning now to FIG. 1A, an image 100 of a scene to which synthetic SDOF effects are desired to be applied is shown. In image 100, there are three human subjects (102/104/106) at three different depths in the scene, with subject 102 being at the shallowest depth, followed by subject 104, followed by subject 106, who is located at the deepest depth in the scene. However, despite being at different depths in the scene, the three human subjects (102/104/106) form a single contiguous section in the segmentation mask 110 for the image 100, as will be discussed in greater detail below.

Figure 1B:
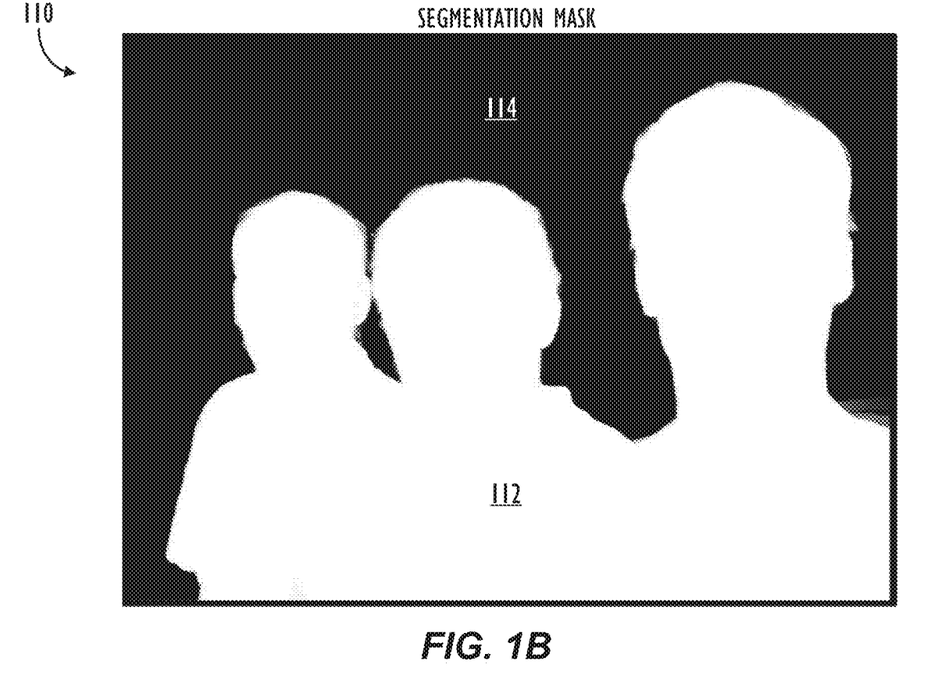
FIG. 1B is a segmentation mask for the image shown in FIG. 1A, according to one or more embodiments.

Turning now to FIG. 1B, a segmentation mask 110 for the image 100 of FIG. 1A is shown, according to one or more embodiments. Semantic segmentation masks may be used to encode a mapping of image pixels to two or more semantic classes, where the classes describes the semantic object or category that the respective pixel belongs to. The segmentation mask 110 uses a convention wherein white pixels represent the regions 112 within image 100 determined to comprise people pixels, and wherein black pixels represent the regions 114 within image 100 determined to comprise non-people pixels.

Depending on the specific segmentation scheme used, pixel classifications may be discrete (i.e., to encode given classes) or continuous (i.e., to encode the probability of a class). For example, with a person segmentation CNN, rather than the output being binary (e.g., wherein a value of =person pixel, and a values of '0'=non-person pixel), the network may produce intermediate probability values (e.g., 0.75=75% chance the pixel is part of a person). In addition to the segmentation mask itself, depending on the segmentation scheme used, a confidence map (not shown) may also be generated. Such confidence maps encode the relative certainty of class predictions described by the segmentation mask. By leveraging confidence maps and/or continuous probabilities of semantic segmentations, algorithms can behave in a significantly more robust manner, e.g., by allowing the semantic segmentation to have a greater influence on the blur map refinement process only where the segmentation is likelier to be accurate, as will be discussed in further detail below.

In some embodiments, the semantic segmentation may further comprise a form of instance segmentation. In instance segmentation, each separate instance of a person (or other semantic class of interest) that is found in the image may be encoded as a separate segmentation class. In such cases, instance segmentation may help prevent an SDOF effect rendering process from smoothing over the depth of an entire contiguous segmented area (i.e., pushing all the pixels in the contiguous segmented area to have the same depth and/or amount of blurring), which may look unnatural, especially in images where the contiguous segmented area may comprise multiple different people that are contiguous in the segmentation mask, but are actually positioned at different depths in the scene, as in the case of human subjects 102/104/106 in image 100 of FIG. 1A.

Figure 1C:
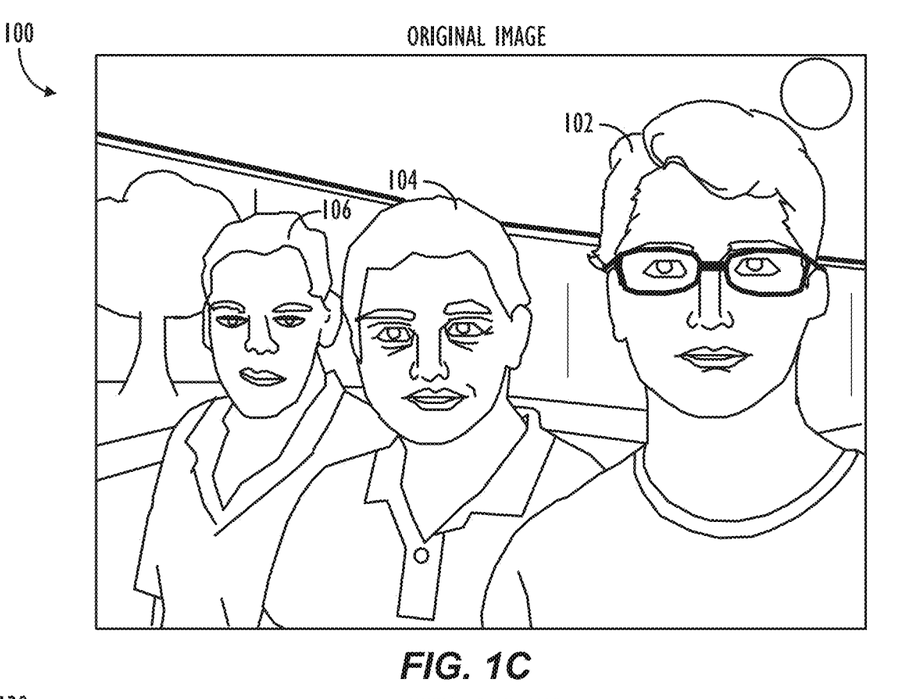
FIG. 1C is a reproduction of the image shown in FIG. 1A, to which synthetic SDOF effects are desired to be applied.
Figure 1D:
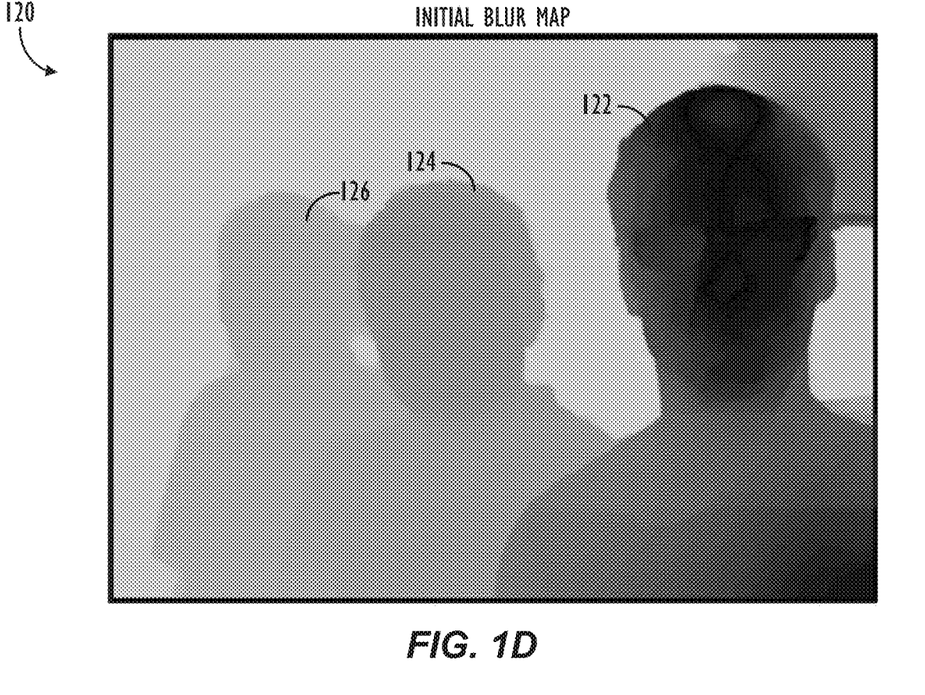
FIG. 1D is an initial blur map for the image shown in FIG. 1A.

Turning now to FIG. 1D, an initial blur map 120 for the image 100 shown in FIG. 1A is illustrated. In the convention of initial blur map 120, brighter pixels reflect pixels that are estimated to be farther from the focal plane, e.g., deeper, in the scene (thus resulting in a greater amount of blurring being applied during an SDOF rendering process), and darker pixels reflect pixels that are estimated to be closer to the focal plane, e.g., shallower, in the scene (thus resulting in a lesser amount of blurring being applied during an SDOF rendering process). As shown in FIG. 1D, the various human subjects 102/104/106 from image 100 are represented in the initial blur map 120 at positions 122/124/126, respectively. Initial blur map 120 also reflects the fact that subject 122 will receive comparatively less blurring than subjects 124/126, located deeper in the captured scene. Also shown in FIG. 1D, the face and clothing of subject 122 exhibit some degree of variation in the initial blur map 120, e.g., as evident from the outline of subject 122's eyeglasses, which have, apparently been estimated in the initial blur map to be at a slightly different depth than the other portions of subject 122's face.

As will be discussed in greater detail below, such variations in the blur map may cause undesirable variations in the amount of blurring applied to subject 122. This can be particularly objectionable if these variations occur at a portion of the image that human viewers are especially sensitive to, such as the face of a human subject of interest in the captured scene. Thus, it may now be understood that additional refinements to the initial blur map, e.g., those that take into account the semantic meaning and characteristics of the various objects in the captured scene, may be desirable to allow for the generation of higher quality synthetic SDOF images.

Note that FIG. 1C is simply a reproduction of the image 100 shown in FIG. 1A, to which synthetic SDOF effects are desired to be applied. Image 100 is reproduced in FIG. 1C only for ease of comparison purposes with the corresponding initial blur map 120 of FIG. 1D.

Figure 1E:
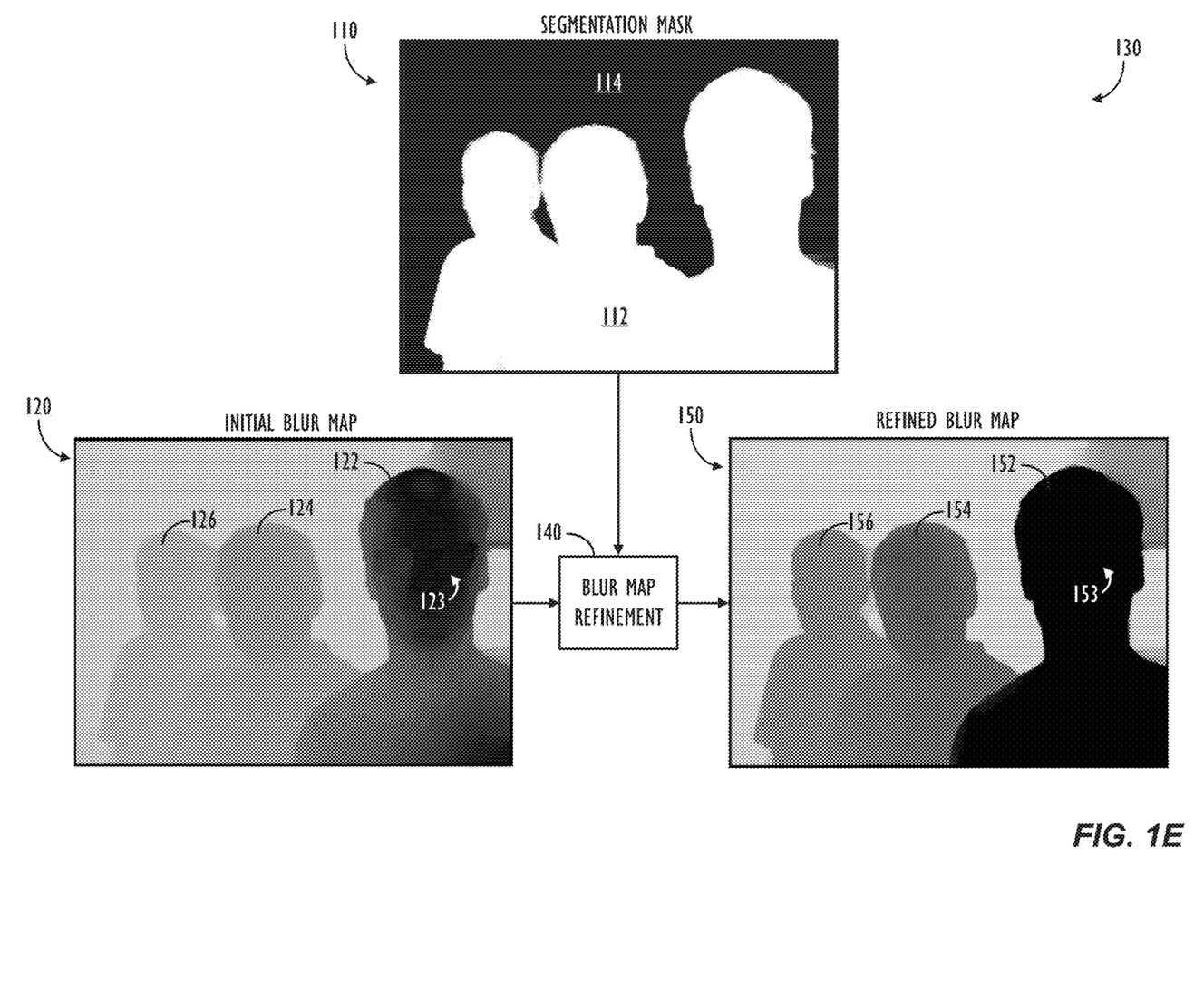
FIG. 1E is a block diagram illustrating a blur map refinement operation, according to one or more embodiments.

FIG. 1E is a block diagram 130 illustrating a blur map refinement operation 140, according to one or more embodiments. As illustrated in FIG. 1E, information from the segmentation mask 110 and an initial blur map 120 are combined in blur map refinement operation 140, which will be described in greater detail below, resulting in a refined blur map 150.

As may be noticed by a comparison of initial blur map 120 and refined blur map 150, the refined blur map 150 has determined that a reduced amount of blurring should be applied (i.e., reflected as darker pixels in the blur map) in the portions of the image corresponding to human subjects 152/154/156 (i.e., as compared to their representations 122/124/126, respectively, in initial blur map 120). The intentional reduction in blurring from the values estimated in the initial blur map 120 mentioned above may also have the effect of allowing human subjects that are deeper in the scene (e.g., subject 156) to be rendered as being somewhat more in focus than the background of the scene, though not entirely sharp, which may further aid in the creation of natural-looking rendered SDOF images.

According to other embodiments, the blur map refinement operation may also attempt to smooth out the amount of blurring applied within the faces and bodies of human subjects 152/154/156 (i.e., reflected as less variation in the color of the pixels in the refined blur map 150 in the portions of the image corresponding to the faces and bodies of human subjects 152/154/156), resulting in a more natural looking rendered SDOF image. The smoothing of the initial blur map 120 in refined blur map 150 may also be seen by comparing the relatively large amount of variation in the blur map values in face 123 in initial blur map 120 to the relative lack of variation in blur map values in corresponding face 153 in refined blur map 150.

Further, the fine details of the human subjects in the scene, e.g., around the edges of the human subjects' heads and bodies, may be better preserved in refined blur map 150, in such a way that unwanted artifacts in portions of the image corresponding to the edges of the segmentation mask (e.g., the aforementioned ghosting or shimmering artifacts) may be minimized in the rendered SDOF image. Particular details of how the information from the segmentation mask 110 and the initial blur map 120 may be combined in a robust fashion to generate improved refined blur maps will now be described in greater detail.

Exemplary Process Overview

Figure 2:
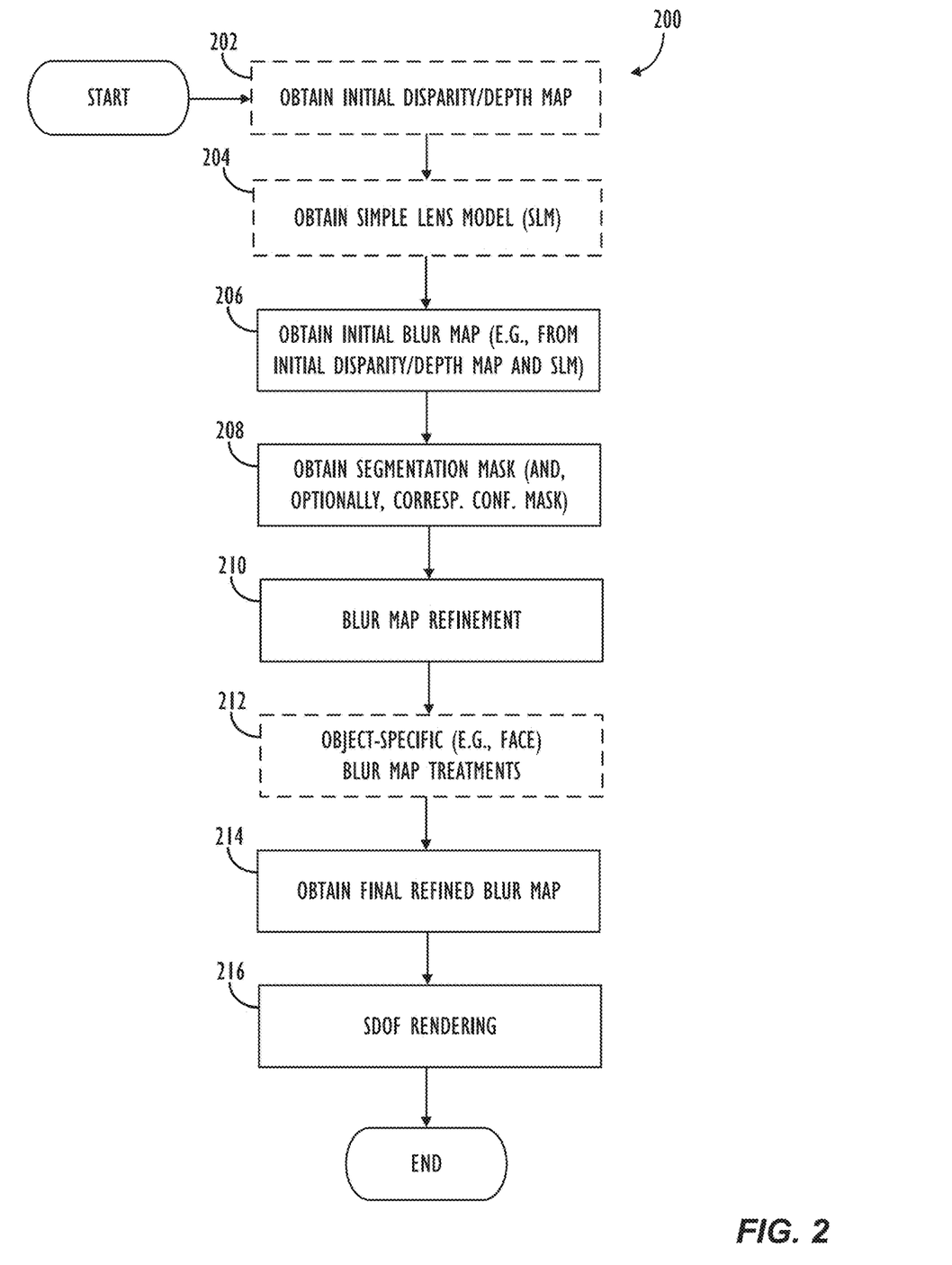
FIG. 2 is an exemplary method for synthesizing SDOF effects using a refined blur map, according to one or more embodiments.

Turning now to FIG. 2, an exemplary method 200 for synthesizing SDOF effects using a refined blur map is shown, according to one or more embodiments described above. First, the method 200 may begin by optionally obtaining an initial disparity/depth map for a captured image, e.g., from any desired disparity or disparity estimation modality (Step 202). For example, as discussed above, this initial information may be obtained from, e.g., a secondary stereo camera, focus pixels, and/or other types of depth/disparity sensors, such as lasers, structured light, IR sensors, etc.

Next, a Simple Lens Model (SLM) may optionally be obtained (Step 204). The SLM may be used, for example, to determine an initial estimate of how blurry a given pixel should be rendered, based on various characteristics of the lens model, and/or the image sensor, focal plane, etc., used to capture the image to which SDOF effects are being rendered. It is to be understood that one or more of the lens model characteristics mentioned above may refer to the type of lens that SDOF effects are being emulated for—and not the lens that was actually used to capture the image. For example, the image may have been captured by a fixed aperture camera lens, but the synthetic SDOF rendering process may be attempting to emulate the image having been captured by a lens having a different aperture size. Thus, according to some embodiments, at Step 206, an SLM (e.g., from Step 204) may be used to aid in the conversion of an initial disparity/depth map (from Step 202) into an initial blur map, such as the initial blur map 120 discussed above with reference to FIG. 1D. In other embodiments, an initial blur map may be obtained directly (or indirectly) from one or more other sources, and thus may not have to be estimated or generated directly from disparity/depth information and/or an SLM, as is shown in optional Steps 202 and 204.

Next, the process may obtain one or more segmentation masks for the captured image and, optionally, the corresponding confidence masks for one or more of the segmentation masks (Step 208). As discussed above, the segmentations may be binary, multi-class, or even continuous. The segmentations masks and confidence masks may be produced by a neural network or other machine learning-based system. The confidence masks may reflect the confidence that the given neural network or other machine learning-based system has in its segment classification of any given pixel in the reference color image.

Next, the method 200 may perform a blur map refinement operation on the initial blur map, thereby creating a refined blur map (Step 210). As described above, in some embodiments, knowledge of the various segmentation classes identified in the image (and the typical blurring preferences for objects in such classes) may allow the method 200 to intelligently refine the blur values from the initial blur map to create a higher quality and/or more natural-looking synthetic SDOF image.

According to some embodiments, the values in the initial blur map may be represented as: $b_0(x,y)$, where $b_0$ refers to an initial blur map value, and (x,y) signifies the pixel location within the blur map to which the blur map value applies. For example, in some embodiments, the value $b_0$ may refer to a blurring radius that is to be applied at the pixel located at position (x,y) in the captured image. In some embodiments, $b_0$ may be a positive number between 0 and 1. In other embodiments, any desired upper bound for values in the blur map may be used.

According to some embodiments, the values in a segmentation mask may be represented as: $S(x, y)$, where S refers to a segmentation mask value, and (x,y) signifies the pixel location within the segmentation mask to which the segmentation mask value applies. For example, as described above, in some embodiments, the value of S may be set to '1' if a pixel is considered to be part of a segmentation, or may be set to '0' if a pixel is not considered to be part of a segmentation. In other embodiments, as described above, more than two classes may be possible within a given segmentation mask and/or continuous probability values may be used (i.e., to encode the relative probability of a pixel belonging to a given class).

Thus, according to some embodiments, the values within an initial blur map, $b_0$, may be modified according to the following equation to create a refined blur map:

$$b_r(x,y) = b_0(x,y) - \alpha * S(x,y) \quad \text{(Eqn. 1)},$$

wherein $b_r(x,y)$ refers to the refined blur map value of the pixel located at position (x,y), $b_0(x,y)$ refers to the initial blur map value of the pixel located at position (x,y), $S(x,y)$ refers to the segmentation mask value of the pixel located at position (x,y), and $\alpha$ is a tunable strength parameter that defines how much influence is given to the value in the segmentation mask in the determination of the refined blur map value for a given pixel. For example, if a given pixel is part of the segmented class (i.e., an 'S' value of 1, or close to 1), then it may be desirable to push the given pixel to be sharper in the final rendered SDOF image. As shown in Equation 1, above, the larger the values of the α *S term, the greater the amount of blurring that will be removed from the given pixel in the final rendered SDOF image. By contrast, if a given pixel is not part of the segmented class (i.e., an 'S' value of 0 or close to 0), then it may be desirable to allow a certain amount of blurring (up to the entire value from the initial blur map) to be applied to the pixel in the final rendered SDOF image. As shown in Equation 1 above, the smaller the values of the α*S term, the less the amount of blurring from the initial blur map will be reduced in the final rendered SDOF image and, conversely, the larger the values of the α *S term, the more the amount of blurring from the initial blur map will be reduced in the final rendered SDOF image. As may also now be understood, larger values of the tunable strength parameter, α, will allow the values in the segmentation mask to have a greater effect on the amount that the value in the initial blur map is modified.

In other embodiments, the framework of Eqn. 1 shown above may be modified, based on the semantic meaning of the segmented class. For example, if the segmented class is an object that is typically found in the background of a captured scene (e.g., the Sun), then the minus sign in front of the "α *S(x,y)" term in Eqn. 1 could be changed to a plus sign. In other words, the refinement operation could add additional blurring to pixels determined to be part of the segmented class (as opposed to reducing the amount of blurring applied to pixels when the segmented class refers to an object that is desired to be in focus in the rendered SDOF image, such as people). In this way, if the initial depth/disparity estimates had errors or missing information for the pixels relating to the Sun in the image (e.g., classifying those pixels as foreground), this error could be compensated for by "adding back in" the additional blurring via the addition of the "α*S(x,y)" term. As may be appreciated, similar modifications could also be applied for different segmentation classes, based on the semantic meanings of such classes and the amount of blurring that is typically desirable in objects of such classes.

According to other embodiments, one or more additional tunable strength parameters may also be used in the determination of the refined blur map values, $b_r$, e.g., as is shown below in Equation 2:

$$b_r(x,y)=\beta(1-S(x,y))^\gamma * b_0(x,y)-\alpha * S(x,y) \quad \text{(Eqn. 2)},$$

wherein β represents an additional tunable strength parameter that will allow the values in the initial blur map to be increased in the refined blur map for given pixels that are not classified as being in the segmentation mask, and γ represents a linearity factor that may, e.g., be used to tune how sharply the amount of blurring from the initial blur map is removed for a given pixel, based on the given pixel not being in the segmentation mask (i.e., an 'S' value of 0 or close to 0). As mentioned above, moderately increasing the amount of blurring to be applied to areas of the image that are not considered as being a part of the segmented class could help alleviate (or make less noticeable) some of the errors/inaccuracies in the initial depth/disparity estimates. In some embodiments, the values of α and/or β may also be modulated based on the lens aperture that the SDOF rendering process is trying to simulate. For example, when attempting to simulate larger apertures (i.e., those where there is a stronger shallow depth of field effect), the tunable strength parameters α and/or β may be modulated adaptively to account for more blurring in the resultant SDOF image, if so desired.

As mentioned above, segmentation masks may also provide corresponding confidence masks reflecting an amount of confidence that the segmentation operation had in the classification of a given pixel in the segmentation mask. Thus, according to still other embodiments, the framework for determining refined blur map values ($b_r$) could be further modified to take confidence levels into account, e.g., as shown below in Equation 3:

$$b_r(x,y)=\beta *(1-S(x,y)*C(x,y))^\gamma * b_0(x,y)-\alpha * S(x,y)*C(x,y) \quad \text{(Eqn. 3)},$$

wherein C(x,y) refers to the confidence in a given segmentation mask value of the pixel located at position (x,y).

As may now be understood, the blur map refinement operations described herein may advantageously fuse together insights from both the initial depth/disparity estimates and the segmentation information—rather than relying fully on one source of information to the exclusion of other sources. Doing so adds additional robustness to the blur map generation process, and allows the system to produce natural-looking results in a wide variety of image capturing scenarios.

Next, returning back to method 200 of FIG. 2, one or more object-specific blur map treatments may be applied to the refined blur map (Step 212). For example, as described in the commonly-assigned patent application bearing U.S. Pat. Publ. No. 2018/0070007 (hereinafter, "the '007 publication"), which is hereby incorporated by reference in its entirely, in some embodiments, a special treatment may be applied to regions of the blur map corresponding to regions of interest in the image, e.g., the faces and/or bodies of human subjects. For example, according to some embodiments, the object-specific treatment applied to a human face may comprise smoothing out the blur values in the refined blur map for pixels corresponding to a human face (i.e., such that the pixels corresponding to the human face are rendered in focus and/or with a common amount of blurring). One example of this type of treatment is shown in the aforementioned representation of the face 153 of subject 152 in the refined blur map 150 of FIG. 1E. Compared with the representation of the face 123 of subject 122 in the initial blur map 120, the face 153 is much more uniformly represent by black (i.e., sharp) pixels, resulting in human subject 102 being rendered as fully sharp in the resultant rendered SDOF image, rather than with regions of slight blurring, e.g., due to errors or minor variations in the initial depth/disparity map.

In other embodiments, the object-specific treatment applied at Step 212 may further comprise a soft 'roll-off' function (e.g., a gradient-based function) to the blur map values of pixels located around the border of the identified object of interest (e.g., based on such pixels' relative depth and/or distance from the object of interest), so as to soften the transition to the values in the rest of the blur map and/or soften any depth/blurring errors that may be caused by the fine details present around the border of the object of interest (e.g., fine details in facial hair or other hair around the face of a person, where the initial depth map cannot distinguish between pixels relating to the person and pixels not related to the person with sufficient spatial resolution).

Once the final refined blur map has been obtained at Step 214, e.g., as the result of a blur map refinement operation at Step 210 and/or the application of one or more object-specific blur map treatments at Step 212, the method 200 may perform an SDOF rendering operation (Step 216) that translates the values in the final refined blur map into an amount of blurring to be applied at each pixel location in the captured image, thereby generating a synthetic SDOF image. As mentioned above, the improved blur map refinement techniques described herein may also be utilized in various other photography applications in addition to portrait-style SDOF imaging, e.g., in Augmented Reality (AR) or Virtual Reality (VR) applications and/or in relighting applications, if so desired.

Exemplary System Overview

Figure 3:
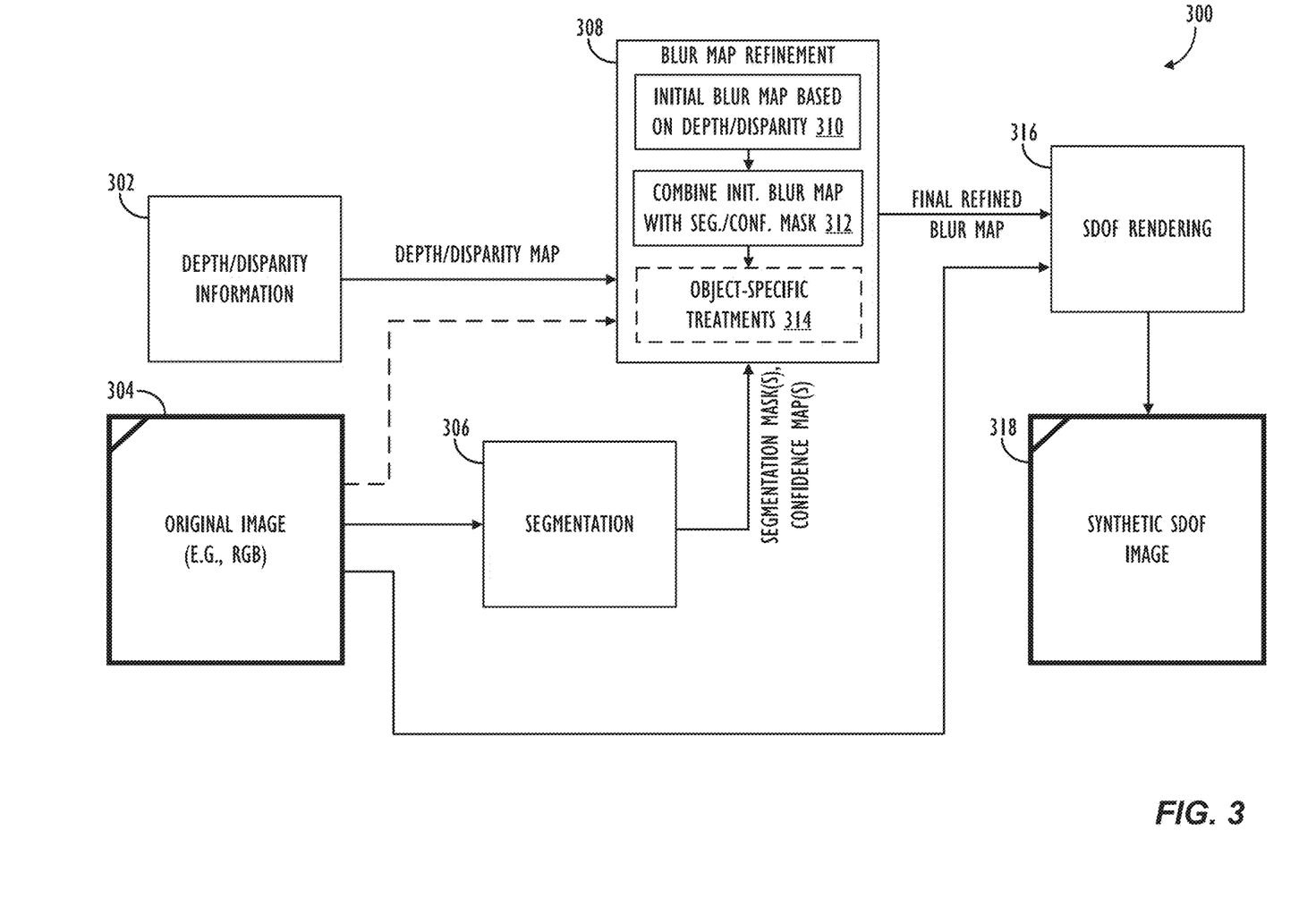
FIG. 3 is a block diagram of a system for generating refined blur maps, according to one or more embodiments.

Turning now to FIG. 3, a block diagram of a system 300 for generating refined blur maps is shown, according to one or more embodiments. Beginning at the left-hand side of FIG. 3, an original color image (e.g., in RGB format) 304 may be obtained by the system. In conjunction with the original color image 304, initial depth/disparity information 302 may be obtained from a desired modality, e.g., in the form of an initial depth or disparity map for the original color image 304. Further, segmentation operation 306 may be performed upon the original color image 304, resulting in any number of desired segmentation masks, any number of which segmentation masks may have corresponding confidence masks. As mentioned above, each such segmentation mask produced over the original color image may have as many classes as is desired. In instances where multiple segmentation masks are obtained, the influence of each such segmentation mask on the refinement of the values in the initial blur map may, e.g., be equal, be based on the relative confidence of each segmentation mask at a given pixel position, or may be individually tuned for the needs of a particular implementation and/or the semantic meaning of the various segmented objects/regions of the respective segmentation masks.

Each of the sources of information, i.e.: depth/disparity map (302), the original color image data (304) (if so desired for a given implementation), and the segmentation information (306) may then be fed into a blur map refinement operation 308. As described above, blur map refinement operation 308 may: obtain an initial blur map, e.g., based on the obtained depth/disparity map and an SLM for the capturing camera (Step 310); combine the initial blur map with the segmentation mask (and, optionally, confidence mask) information in a robust fashion that respects the semantic meaning of the various segmentation classes identified by the one or more segmentation masks (e.g., as described above with reference to FIG. 2) to generate a refined blur map (Step 312); and then optionally apply one or more additional treatments, e.g., object-specific treatments (such as those described in the '007 publication), to the refined blur map (Step 314). The result of the blur map refinement operation will then be a final refined blur map that has taken into account both the initial depth/disparity-based estimates of blur and the semantic meanings of the various segmentation classes appearing in the image. The values in the final refined blur map may then be translated by an SDOF rendering process (316) into a corresponding amount of blur to apply to the captured image according to any desired method, thus resulting in an improved synthetic SDOF image (318).

In some embodiments, as shown by the dashed line arrow in FIG. 3, the color image data 304 may also be used in the blur map refinement process. For example, the initial blur map values could be further refined based on neighboring pixels that are similar in color value to a given pixel. For example, a given pixel's initial blur value could be modified according to a weighted average of all sufficiently similarly-colored pixels in a n-by-n neighborhood surrounding the given pixel. In some embodiments, this color image-based blur map modification step could be applied prior to the robust use of semantic segmentation information to further refine the initial blur map values. In some embodiments, a filter, e.g., a bilateral filter, could be employed, so as to enforce consistency in treatment of pixels across a region.

It should also be noted that the blur map refinement techniques described herein are also compatible with other methods of blur map modification and/or SDOF rendering. For example, if the refined blur maps described herein are applied with traditional "overlay" SDOF rendering techniques (i.e., those techniques wherein the fully sharp versions of the segmented regions are overlaid directly on top of the blurred background), improved results may still be achieved, e.g., due to the fact that the amount of blurring applied to pixels incorrectly characterized as background objects by the initial blur map will have been somewhat reduced, thereby reducing the sharp transition between in focus and blurred objects typically seen in embodiments employing the traditional "overlay" approach to synthetic SDOF rendering. As another example, the object-specific blur map treatments referred to in 212/314 may also seamlessly be incorporated in conjunction with the various segmentation-aware blur map refinement processes described herein.

Exemplary Electronic Device

Figure 4:
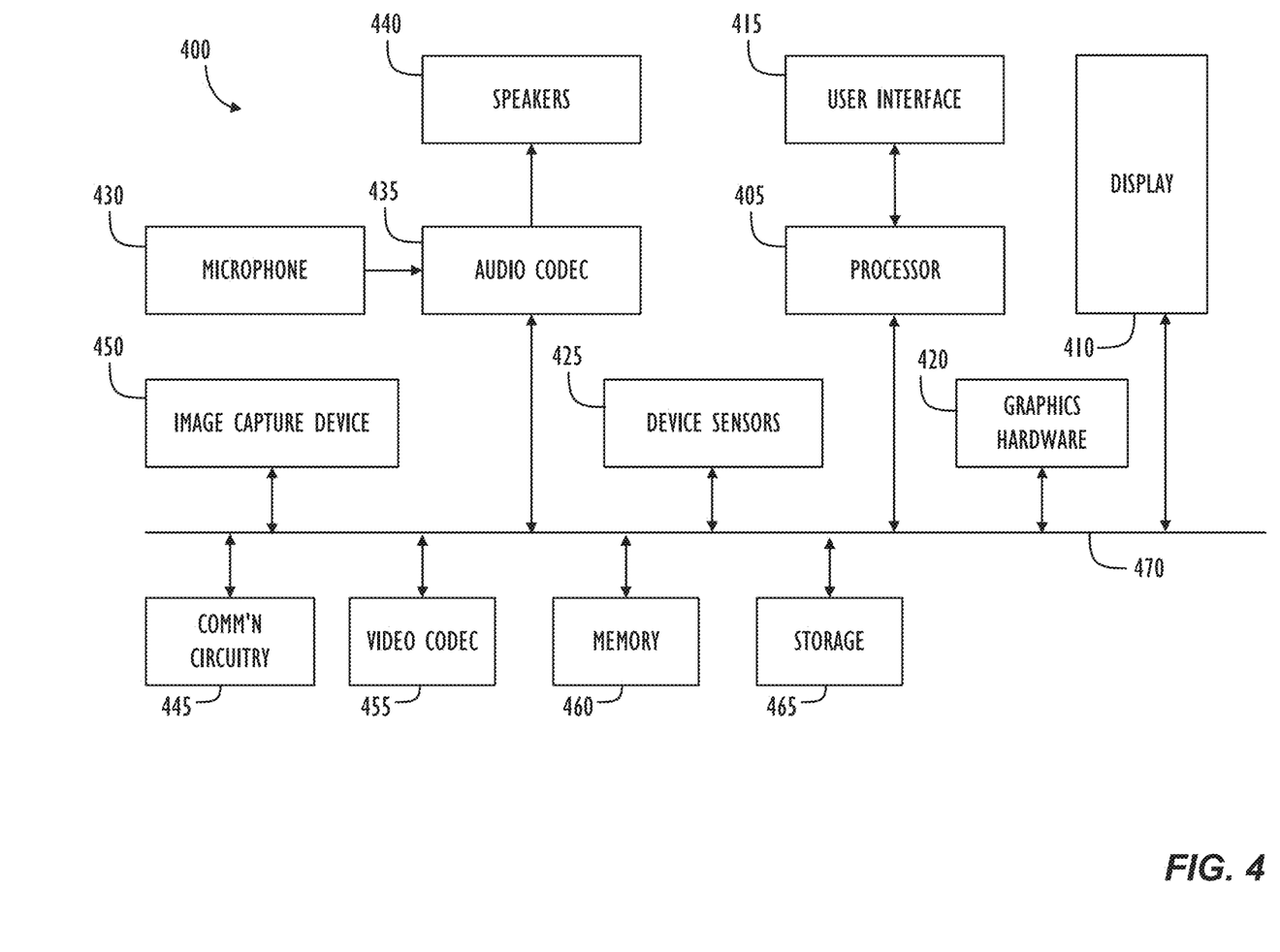
FIG. 4 is a block diagram illustrating an exemplary electronic device, in which one or more of the techniques disclosed herein may be implemented.

Referring now to FIG. 4, a simplified functional block diagram of illustrative programmable electronic device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of blur map information in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks.

In one embodiment, graphics hardware 420 may include one or more programmable graphics processing units (GPUs).

Image capture device 450 may comprise one or more camera units configured to capture images, e.g., images which may be processed to generate refined blur map information for such captured image, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein.

It is to be understood that the above description is intended to be illustrative, and not restrictive. For example, the use of semantic segmentation to refine blur maps and improve their quality as described in this disclosure can be used with multiple sensor modalities and is not dependent on the specific sensing or hardware involved in creating the initial depth/disparity estimates upon which the initial blur map is based. Applications include, but are not limited, to initial blur maps based on depth/disparity information computed from a traditional stereo image pair, disparity computed from focus pixels (i.e., pixels used for phase detection autofocus), and depth acquired via active sensing. Also, in this disclosure, both depth and disparity estimation are referred to. It is to be understood that, broadly speaking, disparity may be viewed as inversely proportional to depth.

Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
   obtain a first image of a scene, the first image comprising a first plurality of pixels, the pixels having color values;
   obtain an initial blur map for the first image;
   obtain at least one segmentation mask comprising a first plurality of segmentation values, wherein each segmentation value corresponds to a pixel in the first image;
   perform a refinement operation on the initial blur map, wherein the refinement operation is based, at least in part, on the at least one segmentation mask and the initial blur map;
   generate a refined blur map for the first image based on the refinement operation; and
   generate a blurred version of the first image based, at least in part, on the refined blur map.

2. The non-transitory program storage device of claim 1, wherein the instructions further cause the one or more processors to: obtain a confidence mask for one of the at least one obtained segmentation masks, wherein the refinement operation is further based, at least in part, on the obtained confidence mask.

3. The non-transitory program storage device of claim 1, wherein the at least one segmentation mask comprises at least two segmentation masks, and wherein the refinement operation is further based, at least in part, on each of the at least two segmentation masks.

4. The non-transitory program storage device of claim 1, wherein the refinement operation further comprises modifying a value in the initial blur map corresponding to a first pixel from the first plurality of pixels based, at least in part, on a value in one of the at least one segmentation masks corresponding to the first pixel.

5. The non-transitory program storage device of claim 4, wherein modifying the value in the initial blur map corresponding to the first pixel from the first plurality of pixels further comprises at least one of the following: increasing the value in the initial blur map corresponding to the first pixel from the first plurality of pixels; or decreasing the value in the initial blur map corresponding to the first pixel from the first plurality of pixels.

6. The non-transitory program storage device of claim 1, wherein the refinement operation is further based on at least one tunable strength parameter.

7. The non-transitory program storage device of claim 1, wherein the instructions further cause the one or more processors to: perform an object-specific blur treatment on the refined blur map.

8. The non-transitory program storage device of claim 7, wherein the object-specific blur treatment comprises at least one of the following: a face-specific blur treatment; or a body-specific blur treatment.

9. The non-transitory program storage device of claim 1, wherein at least one of the at least one segmentation masks is obtained as an output from a neural network.

10. An electronic device, comprising:
    a memory;
    one or more image capture devices;
    a display;
    a user interface; and
    one or more processors operatively coupled to the memory, wherein the one or more processors are configured to execute instructions causing the one or more processors to:
      obtain a first image of a scene from the one or more image capture devices, the first image comprising a first plurality of pixels, the pixels having color values;
      obtain an initial blur map for the first image;
      obtain at least one segmentation mask comprising a first plurality of segmentation values, wherein each segmentation value corresponds to a pixel in the first image;
      perform a refinement operation on the initial blur map, wherein the refinement operation is based, at least in part, on the at least one segmentation mask and the initial blur map;
      generate a refined blur map for the first image based on the refinement operation; and generate a blurred version of the first image based, at least in part, on the refined blur map.

11. The electronic device of claim 10, wherein the instructions further cause the one or more processors to: obtain a confidence mask for one of the at least one obtained segmentation masks, wherein the refinement operation is further based, at least in part, on the obtained confidence mask.

12. The electronic device of claim 10, wherein the at least one segmentation mask comprises at least two segmentation masks, and wherein the refinement operation is further based, at least in part, on each of the at least two segmentation masks.

13. The electronic device of claim 10, wherein the refinement operation further comprises modifying a value in the initial blur map corresponding to a first pixel from the first plurality of pixels based, at least in part, on a value in one of the at least one segmentation masks corresponding to the first pixel.

14. The electronic device of claim 13, wherein modifying the value in the initial blur map corresponding to the first pixel from the first plurality of pixels further comprises at least one of the following: increasing the value in the initial blur map corresponding to the first pixel from the first plurality of pixels; or decreasing the value in the initial blur map corresponding to the first pixel from the first plurality of pixels.

15. The electronic device of claim 10, wherein the refinement operation is further based on at least one tunable strength parameter.

16. The electronic device of claim 10, wherein the instructions further cause the one or more processors to: perform an object-specific blur treatment on the refined blur map.

17. The electronic device of claim 16, wherein the object-specific blur treatment comprises at least one of the following: a face-specific blur treatment; or a body-specific blur treatment.

18. The electronic device of claim 10, wherein at least one of the at least one segmentation masks is obtained as an output from a neural network.

19. An image processing method, comprising:
obtaining a first image of a scene from one or more image capture devices, the first image comprising a first plurality of pixels, the pixels having color values;
obtaining an initial blur map for the first image;
obtaining at least one segmentation mask comprising a first plurality of segmentation values, wherein each segmentation value corresponds to a pixel in the first image;
performing a refinement operation on the initial blur map, wherein the refinement operation is based, at least in part, on the at least one segmentation mask and the initial blur map;
generating a refined blur map for the first image based on the refinement operation; and
generating a blurred version of the first image based, at least in part, on the refined blur map.

20. The method of claim 19, further comprising: obtaining a confidence mask for one of the at least one obtained segmentation masks, wherein the refinement operation is further based, at least in part, on the obtained confidence mask.

21. The method of claim 19, wherein the at least one segmentation mask comprises at least two segmentation masks, and wherein the refinement operation is further based, at least in part, on each of the at least two segmentation masks.

22. The method of claim 19, wherein the refinement operation further comprises modifying a value in the initial blur map corresponding to a first pixel from the first plurality of pixels based, at least in part, on a value in one of the at least one segmentation masks corresponding to the first pixel.

23. The method of claim 22, wherein modifying the value in the initial blur map corresponding to the first pixel from the first plurality of pixels further comprises at least one of the following: increasing the value in the initial blur map corresponding to the first pixel from the first plurality of pixels; or decreasing the value in the initial blur map corresponding to the first pixel from the first plurality of pixels.

24. The method of claim 19, wherein the refinement operation is further based on at least one tunable strength parameter.

25. The method of claim 19, further comprising: performing an object-specific blur treatment on the refined blur map.

26. The method of claim 25, wherein the object-specific blur treatment comprises at least one of the following: a face-specific blur treatment; or a body-specific blur treatment.

27. The method of claim 19, wherein at least one of the at least one segmentation masks is obtained as an output from a neural network.

* * * * *